Figure 1A:
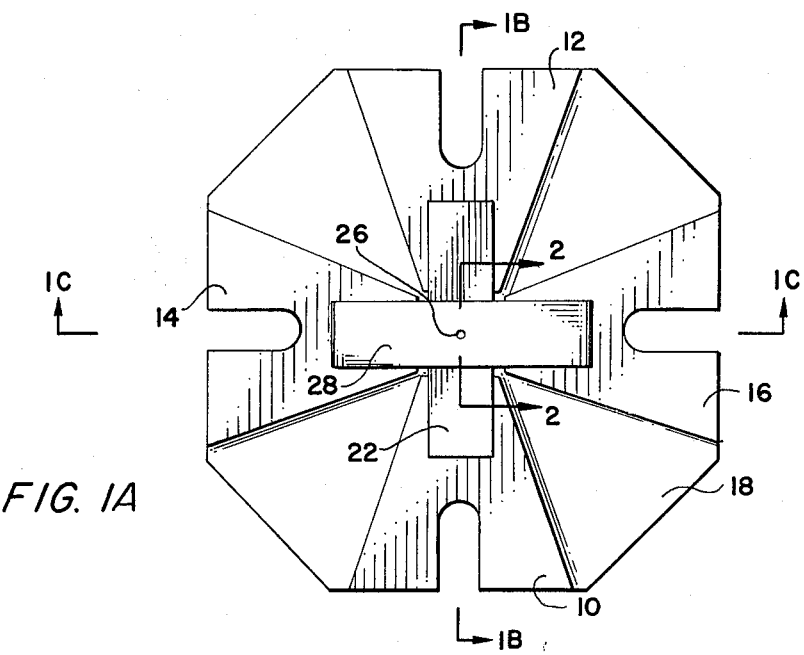

May 18, 1965 J. COHEN 3,184,659
TUNNEL CATHODE HAVING A METAL GRID STRUCTURE
Filed Aug. 13, 1962 3 Sheets-Sheet 1

INVENTOR.
JULIUS COHEN
BY
R. J. Frank
ATTORNEY

May 18, 1965 J. COHEN 3,184,659
TUNNEL CATHODE HAVING A METAL GRID STRUCTURE
Filed Aug. 13, 1962 3 Sheets-Sheet 2
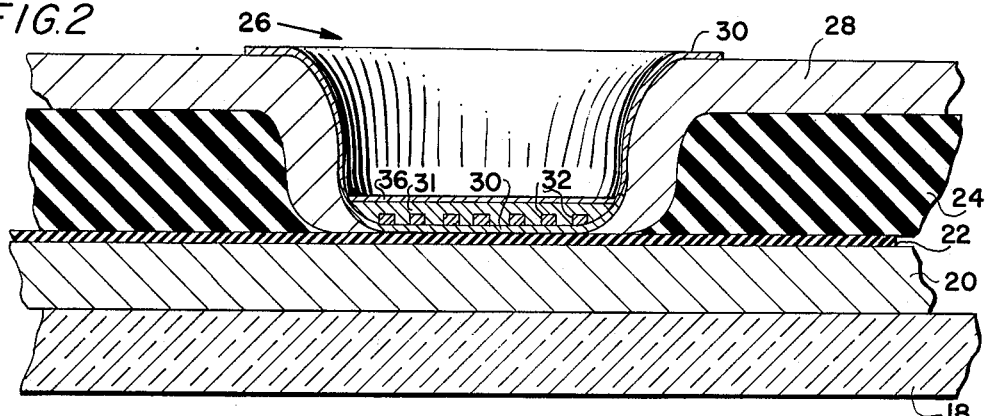
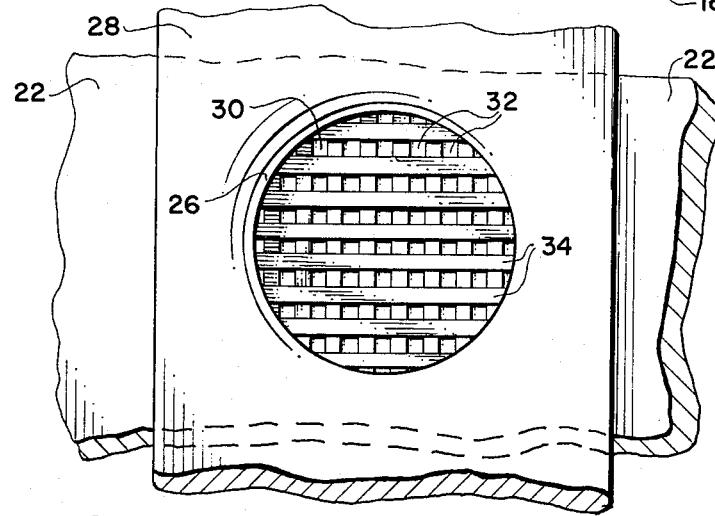
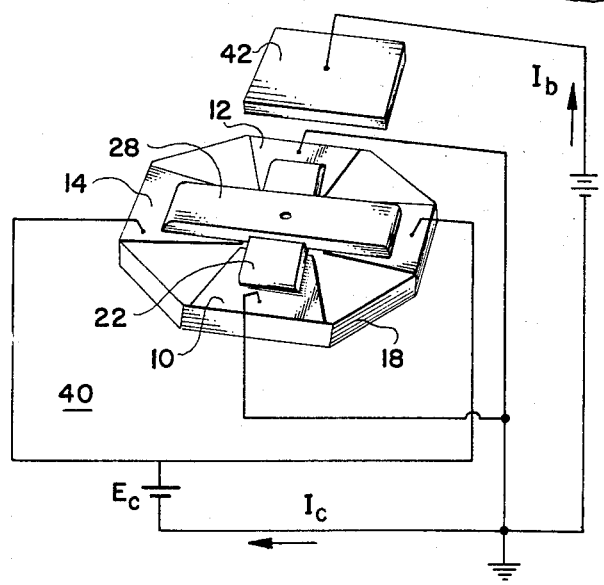
INVENTOR.
JULIUS COHEN
BY
R. J. Frank
ATTORNEY May 18, 1965 J. COHEN 3,184,659
TUNNEL CATHODE HAVING A METAL GRID STRUCTURE
Filed Aug. 13, 1962 3 Sheets-Sheet 3

INVENTOR.
JULIUS COHEN
BY
R. J. Frank
ATTORNEY

United States Patent Office 3,184,659
Patented May 18, 1965

3,184,659
TUNNEL CATHODE HAVING A METAL
GRID STRUCTURE
Julius Cohen, Brooklyn, N.Y., assignor to General Telephone and Electronics Laboratories, Inc., a corporation of Delaware
Filed Aug. 13, 1962, Ser. No. 216,600
8 Claims. (Cl. 317—238)

This invention relates to cathodes and in particular to cathodes in which electron emission is obtained by electron tunneling.

Electron tunneling is a process in which an electron penetrates a potential barrier that is too high for it to surmount. A potential barrier can be defined as a region of finite extent in which the potential energy of the particle exceeds its total energy. In general, the probability that an electron will penetrate a potential barrier increases as the energy of the electron approaches the height of the barrier and as the thickness of the barrier decreases.

Cathodes which utilize electron tunneling generally comprise first and second metal layers separated by an insulating film. When such a device (termed a tunnel cathode) is placed in an evacuated envelope and an electric field of suitable magnitude is applied across the insulating film, electrons in the first metal layer tunnel through the insulating film into the second metal layer. By making the second metal layer sufficiently thin, the probability of the electrons losing their energies by collision is reduced. Consequently, if a voltage greater than the work function of the upper film is applied across the insulator, and a positively charged anode is placed in the envelope adjacent the cathode, many of the electrons pass over the cathode surface barrier and are collected by the anode.

In a paper, "Operation of Tunnel-Emission Devices," by C. A. Mead, Journal of Applied Physics, volume 32, Number 4, April 1961, pages 646–652, there is disclosed a tunnel emission device in which the metal layers are evaporated aluminum and the insulating film is aluminum oxide. One of the aluminum layers forms a relatively thick base and is anodized to produce the insulating film. The other aluminum layer is sufficiently thin to permit tunneling into the surrounding vacuum. When a voltage greater than the work function of the thin aluminum layer is applied across the aluminum oxide film, tunneling occurs through the oxide and an anode current is obtained. It has been found, however, that the current-voltage characteristics of the emitting structure are erratic causing unstable emission and that the current obtained at the highest non-destructive voltage is quite low.

Accordingly it is an object of my invention to provide an improved tunnel cathode.

Another object is to provide a tunnel cathode in which the cathode and anode currents are stable and in which random noise is minimized.

Still another object is to provide a tunnel cathode in which the breakdown voltage is high and in which relatively high cathode and anode current densities can be attained.

Yet another object is to provide a tunnel cathode in which the cathode and anode currents are large when compared to those heretofore obtained in such devices and in which the ratio of the anode to cathode currents is also comparatively great.

A further object is to provide a tunnel cathode which has an appreciable life.

In the present invention a tunnel cathode is provided in which the emitting area comprises and electrically conducting metal base, a thin insulating film formed on the surface of the conducting metal base, a thin conducting metal layer deposited on the insulating film and a conducting metal grid in intimate contact with the surface of the thin metal layer.

In one embodiment of the invention, the thin insulating film is an air-grown oxide of the metal base. (The term "thin" when applied to a film or layer means that its thickness is of the order of 100 angstroms or less; a "thick" layer has a thickness of more than 100 angstroms.) A thick insulating layer is deposited across the thin insulating film, an aperture being left at the center of this layer. The thin metal layer is deposited in the aperture over the thin insulating film and the meal grid deposited in intimate contact with the film. Approximately a monolayer of a metal which reduces the work function of the thin metal layer is applied to this layer in the interstices of the grid.

The thick insulating layer substantially eliminates tunneling currents outside the aperture thereby increasing efficiency, reducing joule heating and increasing stability. The metal grid permits the use of a much thinner metal layer than would be otherwise obtainable since it reduces the heating in the layer and also establishes a more uniform potential distribution along the cathode surface. Thus, higher anode currents and more uniform emission are obtained.

Figure 1B:
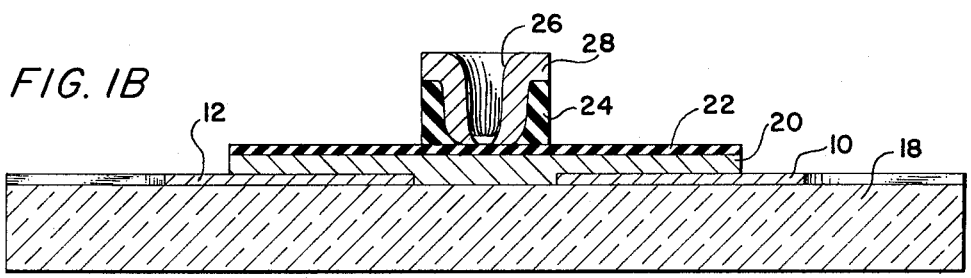
Figure 1C:
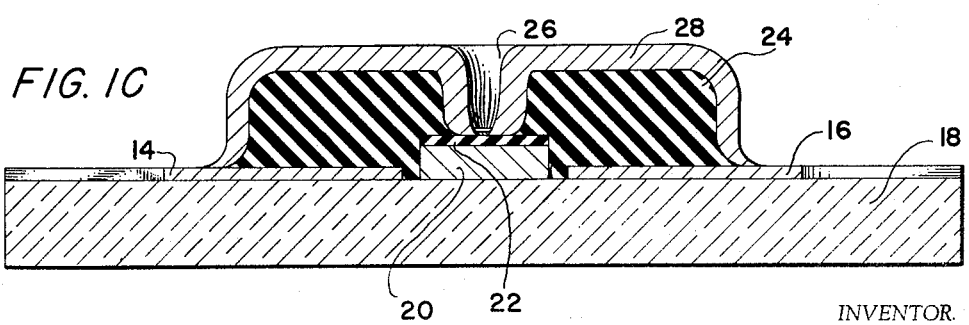
Figure 6:
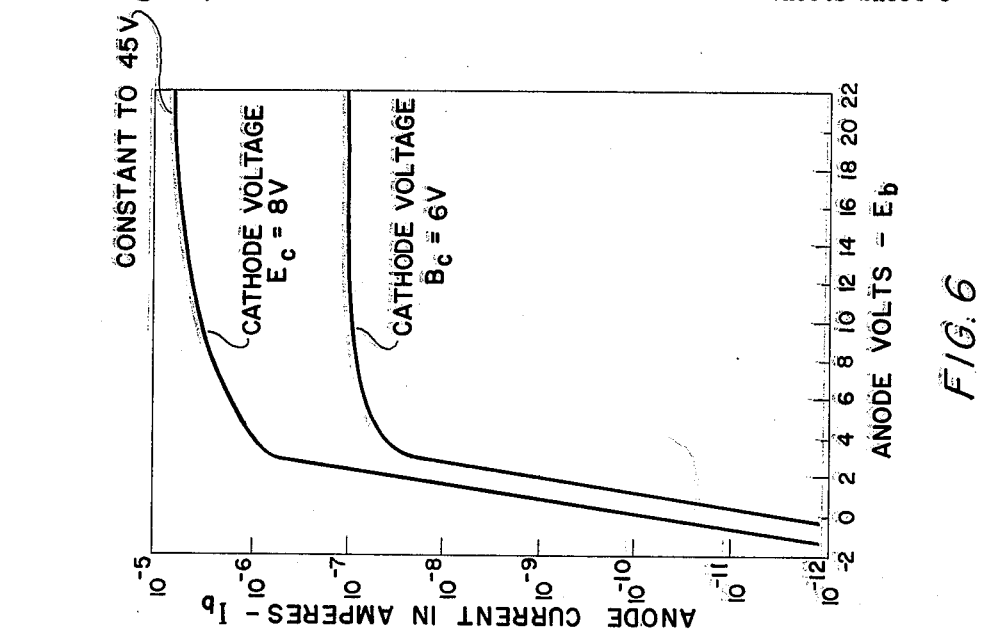
Figure 5:
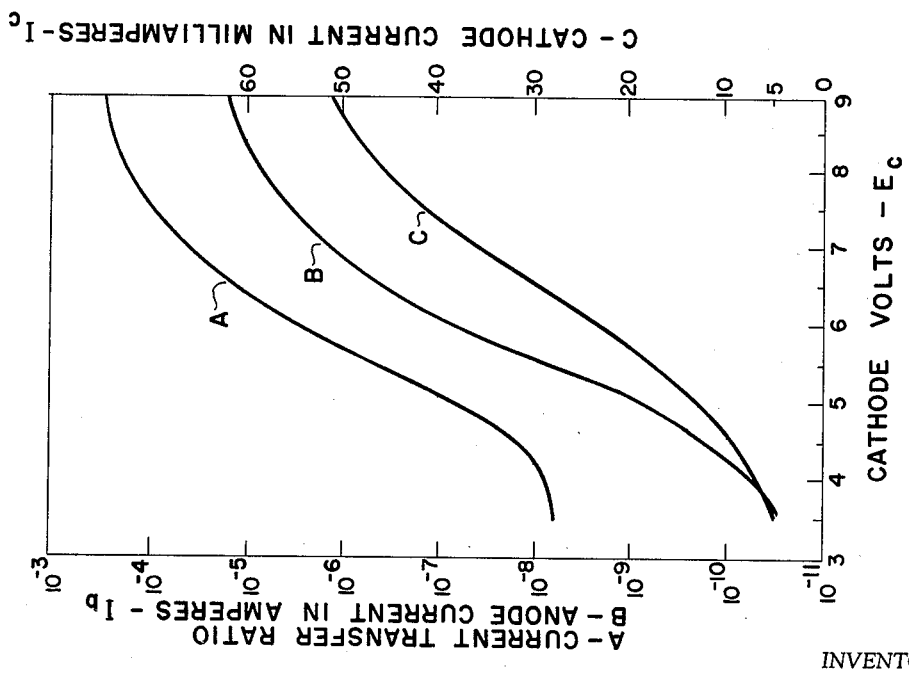

The above objects of and the brief introduction to the present invention will be more fully understood and further objects and advantages will become apparent from a study of the following description in connection with the drawings, wherein:

FIG. 1A is a plan view of my tunnel cathode and FIGS. 1B and 1C are enlarged cross-sectional views taken through the center of the cathode in mutually perpendicular directions, FIG. 2 is a detailed cross-sectional view showing the emitting region of the cathode looking in the direction of FIG. 1B, FIG. 3 is a plan view of the emitting region of FIG. 2 before deposition of the cesium coating, FIG. 4 is a schematic diagram showing the electrical connection to the cathode for obtaining the curve of FIGS. 5 and 6, and FIGS. 5 and 6 are test curves illustrating the performance of my cathode under various operating conditions.

Referring to FIGS. 1A–1C, there is shown a tunnel cathode having four gold electrodes 10, 12, 14 and 16 deposited on a glass substrate 18. A pure (99.999%) aluminum base consisting of a strip 20 is evaporated onto substrate 18, strip 20 making electrical contact with electrodes 10 and 12. Aluminum strip 20 is then exposed to the air and aged several weeks at room temperature to grow a glassy alumina (aluminum oxide) film 22 less than 75 angstroms thick. It has been found that the noise characteristics, stability, and current densities obtainable with an air-grow film are considerably better than those obtained when the film is produced by anodizing the aluminum strip.

A thick insulating silicon monoxide layer consisting of a strip 24 is next evaporated through a mask in a direction transverse to strip 20 leaving a small aperture 26 at the center of the cathode. A thick conducting layer of palladium 28 is then evaporated over the silicon monoxide layer 24, the palladium layer 28 making contact with electrodes 14 and 16 and the aluminum oxide film 22. A thin platinum layer 30 is next evaporated into the aperture 26 and a palladium grid evaporated over layer 30. This is shown in the detailed cross-section and plan views of the emitting region of FIGS. 2 and 3. The palladium grid is formed by evaporating a first set of spaced elongated parallel conductors 32 over layer 30 and then evaporating a second set of spaced elongated parallel conductors 34 over strip 32 and layer 30 in a direction perpendicular to the first set. Finally a monolayer 36 of cesium (shown in FIG. 2) is deposited over the surface of the grid and over the emitting platinum layer 30 in the interstices of the grid.

Layer 28 is made of palladium rather than platinum because a thick layer of palladium is more readily vacuum evaporated onto a substrate. Both palladium and platinum have high melting points and provide excellent power dissipation. The palladium layer 28 reduces the field strength at the edges where aluminum strip 20 and silicon monoxide strip 24 meet thereby allowing the passage of high currents through the cathode without destruction of layers 20 and 30 by puncturing. The silicon monoxide layer 24 substantially eliminates tunneling currents outside the active region of the device thereby decreasing joule heating and permitting the application of higher voltages across the cathode which results in increased emission.

In order to obtain maximum emission from the cathode, the platinum layer 30 should be as thin as possible compared to the mean free path of electrons in the film. However, the thinner the layer the higher the resistance offered to the lateral current flow caused by those electrons which tunnel through the insulating film 22 with energies below the vacuum level. The resultant potential drop along the platinum layer 30 results in reduced and non-uniform emission if the grid composed of palladium conductors 32 and 34 is not provided to establish a more uniform potential along the surface of the cathode. The grid also reduces the resistance of layer 30 by dividing it into small areas and permits the use of a much thinner platinum layer than would otherwise be possible.

In a typical cathode the approximate thicknesses of the various layers are as follows:

Aluminum strip 20 _____ 800 angstroms.
Aluminum oxide film 22 _____ 50 angstroms.
Silicon oxide strip 24 _____ 1500 angstroms.
Palladium layer 28 _____ 600 angstroms.
Platinum layer 30 _____ 25 angstroms.
Palladium grids 32, 34 _____ 600 angstroms thick, 15 microns wide with 15 microns separation between conductors.
Effective area of emitting region __ $1.9 \times 10^{-3}$ cm.$^2$.

It shall be understood that while the materials and dimensions listed above give excellent results, other materials having similar characteristics and dimensions may also be used.

The circuit used to test the cathode is shown schematically in FIG. 4. The cathode 40 is placed in an evacuated envelope (not shown) containing an anode 42. Electrodes 10 and 12 are connected together as are electrodes 14 and 16 to provide a more uniform potential across the insulating film. A first battery having a voltage $E_c$ is coupled between interconnected electrodes 10, 12 and interconnected electrodes 14, 16 producing a cathode current $I_c$. A second battery having a voltage $E_b$ is connected between anode 42 and electrodes 10, 12 to produce the anode current $I_b$.

Curve A of FIG. 5 is a plot of the current transfer ratio $I_b/I_c$ against the cathode voltage $E_c$ obtained with the apparatus of FIG. 4. Curves B and C show the relationships between the anode current $I_b$ and cathode current $I_c$ respectively and the cathode voltage $E_c$. FIG. 6 illustrates the changes in anode current $I_b$ with changes in anode voltage $E_b$ for cathode voltages of 6 and 8 volts respectively. As indicated by these curves, the following currents have been obtained at a maximum cathode voltage of 9 volts D.C. and an anode voltage of 22 volts D.C.:

Cathode current $I_c$ _____ 51.5 milliamperes.
Anode current $I_b$ _____ 15 microamperes.
Anode current density _____ 8 milliamperes per square centimeter.
Current transfer ratio _____ $3 \times 10^{-4}$.

A cathode containing the grid structure and a 25 angstrom platinum film 30 was compared with a cathode in which the grid structure was omitted and the platinum film was 80 angstroms thick, the cathodes being otherwise identical. The results were as follows for cathode voltages of 9.0 and 2.0 volts D.C. respectively, these voltages being the maxima that could be applied across the respective cathodes without destroying them.

|  | Cathode with grid | Cathode without grid |
|---|---|---|
| Cathode current, milliamperes | 51.5 | 500 |
| Anode current, microamperes | 15 | 1 |
| Anode current density, milliamperes per cm.$^2$ | 8 | .13 |
| Transfer ratio | $3 \times 10^{-4}$ | $.02 \times 10^{-4}$ |

These results indicate the improvement obtained by the use of the grid. In addition, a cathode containing a grid has been operating stably and without generation of significant extraneous noise voltages for a period of over 400 hours.

As many changes could be made in the above construction and many different embodiments could be made without departing from the scope thereof, it is intended that all matter contained in the above description or shown in the accompanying drawings shall be interpreted as illustrative and not in a limiting sense.

What is claimed is:
1. A tunnel cathode comprising
  (a) a metal base,
  (b) a thin insulating film having a thickness of not more than 100 angstroms formed on the surface of said metal base, said thin insulating film consisting of an air-grown oxide of said metal base,
  (c) a thick insulating layer having a thickness greater than 100 angstroms deposited on the surface of said insulating film, said insulating layer having an aperture therein,
  (d) a thin metal layer deposited in said aperture on the surface of said insulating film, and
  (e) a metal grid in intimate contact with the surface of said thin metal layer.
2. A tunnel cathode comprising
  (a) a metal base,
  (b) a thin insulating film having a thickness of not more than 100 angstroms formed on the surface of said metal base, said thin insulating film consisting of an air-grown oxide of said metal base,
  (c) a thick insulating layer having a thickness greater than 100 angstroms deposited on the surface of said insulating film, said insulating layer having an aperture therein, and
  (d) a metal grid conductively joined to the surface of said thin insulating film.
3. A tunnel cathode comprising
  (a) a metal base,
  (b) a thin insulating film having a thickness of not more than 100 angstroms formed on the surface of said metal base, said thin insulating film consisting of an air-grown oxide of said metal base, (c) a thick insulating layer having a thickness greater than 100 angstroms deposited on the surface of said insulating film, said insulating layer having an aperture therein, (d) a thin metal layer deposited in said aperture on the surface of said insulating film, (e) a metal grid in intimate contact with the surface of said thin metal layer, and (f) a metal monolayer deposited on the surface of said thin metal layer in the interstices of said grid, said monolayer reducing the work function of said thin metal layer.

4. A tunnel cathode comprising (a) a metal strip, (b) a thin insulating film having a thickness of not more than 100 angstroms formed on the surface of said metal strip, said thin insulating film consisting of an air-grown oxide of said metal strip, (c) a thick insulating strip having a thickness greater than 100 angstroms deposited across the surface of said thin insulating film transverse thereto, said thick insulating strip having an aperture therein in the region where said insulating strips cross, (d) a thin metal layer deposited in said aperture on the surface of said insulating film, (e) a metal grid in intimate contact with the surface of said thin metal layer, (f) a metal monolayer deposited on the surface of said thin metal layer in the interstices of said grid, said monolayer reducing the work function of said thin metal layer, and (g) means for coupling a voltage source between said metal strip and said thin metal layer.

5. A tunnel cathode as defined by claim 4 wherein said metal strip is composed of aluminum and said insulating film consists of a thin air-grown layer of aluminum oxide.

6. A tunnel cathode comprising (a) an insulating substrate, (b) first and second electrode means deposited on the surface of said substrate, (c) a metal strip deposited on the surface of said substrate, said metal strip making electrical contact with said first electrode means, (d) a thin insulating film having a thickness of not more than 100 angstroms formed on the surface of said metal strip, said thin insulating film consisting of an air-grown oxide of said metal strip, (e) a thick insulating strip having a thickness greater than 100 angstroms deposited across the surface of said thin insulating film transverse thereto, said thick insulating strip having an aperture therein in the region where said insulating strips cross, (f) a thin metal layer deposited in said aperture on the surface of said insulating film, (g) a thick metal layer deposited on the surface of said thick insulating layer, said thick metal layer making electrical contact with said second electrode means and said thin metal layer, (h) a metal grid in intimate contact with the surface of said thin metal layer, said metal grid consisting of said first set of parallel elongated conductors and a second set of parallel elongated conductors, said first and second sets of elongated conductors intersecting to form said grid, and (i) a metal monolayer deposited on the surface of said thin metal layer in the interstices of said grid, said monolayer reducing the work function of said thin metal layer.

7. A tunnel cathode as defined by claim 6 wherein said metal strip is composed of aluminum and said thin insulating film of air-grown aluminum oxide, and wherein said first electrode means consists of first and second electrodes connected to opposite ends of said strip and wherein said second electrode means consists of third and fourth electrodes connected to opposite ends of said thick metal layer, said first and second electrodes being adapted for connection to one terminal of a voltage source and said third and fourth electrodes being adapted for connection to the other terminal of a voltage source to provide a uniform potential distribution across said thin insulating film.

8. A tunnel cathode as defined by claim 6 wherein said metal monolayer deposited on the surface of said thin metal layer is composed of cesium.

References Cited by the Examiner

UNITED STATES PATENTS

| | | | |
|---|---|---|---|
| 3,056,073 | 9/62 | Mead | 317—234 |
| 3,098,168 | 7/63 | Aigrain | 313—346 |
| 3,105,166 | 9/63 | Choyke et al. | 313—346 X |
| 3,116,427 | 12/63 | Giaever | 307—88.5 |
| 3,121,177 | 2/64 | Davis | 307—88.5 |

DAVID J. GALVIN, *Primary Examiner.*

JAMES D. KALLAM, *Examiner.*